(12) United States Patent
Bybell et al.

(10) Patent No.: US 9,811,472 B2
(45) Date of Patent: *Nov. 7, 2017

(54) RADIX TABLE TRANSLATION OF MEMORY

(75) Inventors: Anthony J. Bybell, Chapel Hill, NC (US); Michael K. Gschwind, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 573 days.

This patent is subject to a terminal disclaimer.

(21) Appl. No.: 13/517,758

(22) Filed: Jun. 14, 2012

(65) Prior Publication Data

US 2013/0339652 A1 Dec. 19, 2013

(51) Int. Cl.
| | | |
|---|---|---|
| G06F 12/00 | (2006.01) | |
| G06F 12/1009 | (2016.01) | |
| G06F 12/1036 | (2016.01) | |
| G06F 12/1027 | (2016.01) | |
| G06F 12/1018 | (2016.01) | |

(52) U.S. Cl.
CPC ...... *G06F 12/1009* (2013.01); *G06F 12/1018* (2013.01); *G06F 12/1027* (2013.01); *G06F 12/1036* (2013.01)

(58) Field of Classification Search
USPC ................................................ 711/205–208
See application file for complete search history.

(56) References Cited

U.S. PATENT DOCUMENTS

| | | | | | |
|---|---|---|---|---|---|
| 3,781,808 | A | * | 12/1973 | Ahearn et al. | 711/207 |
| 4,914,577 | A | * | 4/1990 | Stewart et al. | 711/207 |
| 4,992,936 | A | * | 2/1991 | Katada et al. | 711/209 |

(Continued)

FOREIGN PATENT DOCUMENTS

| | | |
|---|---|---|
| EP | 0690386 A1 | 1/1996 |
| JP | 2002132581 A | 5/2002 |

(Continued)

OTHER PUBLICATIONS

Barr, Exploiting Address Space Contiguity to Accelerate TLB Miss Handling, Apr. 2010, Rice University, Entire Document.*

(Continued)

*Primary Examiner* — Reginald Bragdon
*Assistant Examiner* — Michael Westbrook
(74) *Attorney, Agent, or Firm* — Cantor Colburn LLP; Steven Chiu

(57) ABSTRACT

Embodiments relate to managing memory page tables in a processing system. A request to access a desired block of memory is received. The request includes an effective address that includes an effective segment identifier (ESID) and a linear address, the linear address including a most significant portion and a byte index. An entry in a buffer that includes the ESID of the effective address is located. Based on the entry including a radix page table pointer (RPTP), performing: using the RPTP to locate a translation table of a hierarchy of translation tables, using the located translation table to translate the most significant portion of the linear address to obtain an address of a block of memory, and based on the obtained address, performing the requested access to the desired block of memory.

15 Claims, 14 Drawing Sheets

(56) References Cited

U.S. PATENT DOCUMENTS

| | | | |
|---|---|---|---|
| 5,125,086 A | | 6/1992 | Perazzoli, Jr. |
| 5,222,222 A * | | 6/1993 | Mehring et al. ............ 711/207 |
| 5,247,634 A | | 9/1993 | Cline et al. |
| 5,282,274 A | | 1/1994 | Liu |
| 5,375,214 A * | | 12/1994 | Mirza et al. ................ 711/207 |
| 5,426,750 A * | | 6/1995 | Becker et al. ............... 711/207 |
| 5,454,091 A | | 9/1995 | Sites et al. |
| 5,465,337 A * | | 11/1995 | Kong ............................ 711/207 |
| 5,479,627 A * | | 12/1995 | Khalidi et al. ............... 711/205 |
| 5,526,504 A * | | 6/1996 | Hsu et al. .................... 711/207 |
| 5,586,283 A * | | 12/1996 | Lopez-Aguado et al. .... 711/207 |
| 5,617,554 A * | | 4/1997 | Alpert et al. ................. 711/208 |
| 5,765,209 A * | | 6/1998 | Yetter .......................... 711/207 |
| 5,774,135 A | | 6/1998 | Letham |
| 5,790,979 A * | | 8/1998 | Liedtke ........................ 711/206 |
| 5,802,605 A * | | 9/1998 | Alpert et al. ................. 711/208 |
| 5,907,867 A * | | 5/1999 | Shinbo et al. ............... 711/207 |
| 5,930,830 A | | 7/1999 | Mendelson et al. |
| 5,946,679 A * | | 8/1999 | Ahuja et al. |
| 5,956,756 A * | | 9/1999 | Khalidi et al. ............... 711/207 |
| 5,963,984 A * | | 10/1999 | Garibay et al. .............. 711/206 |
| 6,185,570 B1 * | | 2/2001 | Ladwig et al. |
| 6,275,912 B1 | | 8/2001 | Haba |
| 7,149,872 B2 | | 12/2006 | Rozas et al. |
| 7,296,139 B1 * | | 11/2007 | Case et al. ................... 711/209 |
| 7,366,869 B2 | | 4/2008 | Sartorius et al. |
| 7,389,395 B1 | | 6/2008 | Garthwaite et al. |
| 7,412,466 B1 | | 8/2008 | Garthwaite |
| 7,447,869 B2 | | 11/2008 | Kruger et al. |
| 7,533,228 B1 | | 5/2009 | Garthwaite |
| 7,562,205 B1 * | | 7/2009 | Case et al. ................... 711/209 |
| 7,779,214 B2 | | 8/2010 | Stecher |
| 7,809,921 B2 | | 10/2010 | Davis |
| 7,917,725 B2 | | 3/2011 | Stecher |
| 7,975,114 B2 | | 7/2011 | Tene et al. |
| 8,037,278 B2 | | 10/2011 | Greiner et al. |
| 8,103,851 B2 | | 1/2012 | Greiner et al. |
| 2001/0025336 A1 * | | 9/2001 | Hirai et al. .................. 711/206 |
| 2004/0215918 A1 | | 10/2004 | Jacobs et al. |
| 2005/0050295 A1 | | 3/2005 | Noel et al. |
| 2005/0108496 A1 | | 5/2005 | Elnozahy et al. |
| 2006/0069899 A1 | | 3/2006 | Schoinas et al. |
| 2006/0149913 A1 | | 7/2006 | Rothman et al. |
| 2006/0149919 A1 | | 7/2006 | Arizpe et al. |
| 2006/0212675 A1 | | 9/2006 | Sartorius et al. |
| 2006/0253682 A1 | | 11/2006 | Armstrong et al. |
| 2007/0079106 A1 * | | 4/2007 | Davis ........................... 711/203 |
| 2007/0294499 A1 | | 12/2007 | Garthwaite |
| 2008/0052486 A1 | | 2/2008 | Davis |
| 2008/0104086 A1 | | 5/2008 | Bare et al. |
| 2008/0104358 A1 | | 5/2008 | Noel et al. |
| 2009/0019253 A1 | | 1/2009 | Stecher et al. |
| 2009/0049320 A1 | | 2/2009 | Dawkins et al. |
| 2009/0182964 A1 * | | 7/2009 | Greiner et al. .............. 711/163 |
| 2009/0182972 A1 * | | 7/2009 | Greiner et al. .............. 711/206 |
| 2010/0011187 A1 | | 1/2010 | Schoinas et al. |
| 2010/0058026 A1 * | | 3/2010 | Heil et al. .................... 711/207 |
| 2010/0125708 A1 * | | 5/2010 | Hall et al. .................... 711/154 |
| 2011/0004739 A1 | | 1/2011 | Hohmuth et al. |
| 2011/0125983 A1 | | 5/2011 | Stecher |
| 2011/0225389 A1 | | 9/2011 | Grisenthwaite |
| 2011/0238946 A1 | | 9/2011 | Rajamony et al. |
| 2011/0276778 A1 * | | 11/2011 | Dooley et al. ............... 711/207 |
| 2011/0283040 A1 * | | 11/2011 | Chadha et al. .............. 711/3 |

FOREIGN PATENT DOCUMENTS

| | | | |
|---|---|---|---|
| WO | 2006106428 A2 | 10/2006 | |
| WO | 2013186645 A1 | 12/2013 | |
| WO | WO 2013/186645 A1 * | 12/2013 | ............ G06F 13/00 |

OTHER PUBLICATIONS

Huck, Architectural support for translation table management in large address space machines, May 1993, ISCA '93 Proceedings of the 20th annual international symposium on computer architecture, pp. 39-50.*

Liedtke, Address Space Sparsity and Fine Granularity, ACM SIGOPS Operating Systems Review, Jan. 1995, vol. 29 Issue 1, pp. 87-90.*

Peng, The PowerPC Architecture[TM]: 64-Bit Power with 32-Bit Compatibility, 1995, Compcon—IEEE—Digest of Papers and Proceedings, pp. 300-308.*

Szmajda, Variable Radix Page Table: A Page Table for Modern Architectures, 2003, Advances in Computer Systems Architecture Lecture Notes in Computer Science vol. 2823, pp. 290-304.*

U.S. Appl. No. 13,517,738; Non Final Office Action; filed Jun. 14, 2012; Date Mailed: Jan. 16, 2014; pp. 1-31.

UK International Search Report and Written Opinion for International Application No. PCT/IB2013/054166, International Filing Date: May 21, 2013; Date of mailing: Aug. 27, 2013, 6 pages.

UK International Search Report and Written Opinion for International Application No. PCT/IB2013/054806; International Filing Date: Jun. 12, 2013; Date of Mailing: Sep. 17, 2013, 9 pages.

IBM, "Power ISA (Trademark) Version 2.06 Revision B," Jul. 23, 2010, Softcopy Distribution: http://www.power.org/resources/reading/, pp. 1-1341.

IBM, "zArchitecture—Principles of Operation," SA22-7832-8, Aug. 2010, pp. 1-1496, http://www.ibm.com/support/documentation.

Intel, "Intel (registered) Itanium (registered) Architecture Software Developer's Manual," vol. 2: System, Architecture, Document No. 245318-005, Revision 2.2, Jan. 2006, pp. 1-654.

Intel, "Intel (registered) Itanium (registered) Architecture Software Developer's Manual," Revision 2.3, vol. 1: Application Architecture, May 2010, 244 pages, Document No. 245317.

U.S. Appl. No. 13,517,763; Non Final Office Action; filed Jun. 14, 2012; Date Mailed: Jan. 22, 2014; pp. 1-32.

U.S. Appl. No. 13,785,212; Non Final Office Action; filed Mar. 5, 2013; Date Mailed: Feb. 5, 2014; pp. 1-31.

U.S. Appl. No. 13,785,188; Non Final Office Action; filed Mar. 5, 2013; Date Mailed: Feb. 6, 2014; pp. 1-29.

T. W. Barr et al., "Translation Caching: Skip, Don't Walk (the Page Table)," ISCA '10, Jun. 19-23, 2010, Saint Malo, France, Copyright 2010 ACM, Jul. 10, 2006, 12 pages.

* cited by examiner

RADIX TABLE TRANSLATION OF MEMORY

BACKGROUND

The present invention relates to managing memory page tables in a processing system, and more specifically, to radix table translation of memory regions in a processing system.

Several address translation mechanisms are used in computer systems. In PowerPC® by IBM, for example, an effective address is translated to a corresponding real address by way of page table entries found by selecting an ESID table entries associated with the effective address, and using the entry to locate a group of page table entry by way of a hashing algorithm. In zArchitecture®, also by IBM, for another example, an effective address is translated to a corresponding real address by way of a hierarchy of translation tables, translation tables are indexed by a portion of the effective address to find the address of the next translation table of the hierarchy until a real (or absolute) address is obtained. Thus, the PowerPC address translation maps a 64 bit effective address (of a large range of memory ($2^{64}$ bytes)) in only 2 levels (an SLB table entry and page table entry), while zArchitecture hierarchical address translation requires 5 tables to translate a large effective address range ($2^{64}$ bytes). Both address translation mechanisms provide advantages to respective operating systems.

EP690386A1 Jan. 3, 1996 "Address translator and method of operation", incorporated herein by reference teaches a CAM/SRAM structure (44) performs address translations that are compatible with a segmentation/paging addressing scheme yet require only a single look-up step. Each entry in the effective-to-real-address-translator has two CAM fields (ESID, EPI) that independently compare an input segment identifier and an input page identifier to a stored segment identifier and a stored page identifier, respectively. The ERAT outputs a stored real address field (DATA) associated with a stored segment-stored page pair if both comparisons are equivalent. The ERAT can invalidate stored translations on the basis of segment or page granularity by requiring either a segment or a page CAM field match, respectively, during an invalidate operation.

U.S. Pat. No. 8,103,851B2 Jan. 24, 2012 "Dynamic address translation with translation table entry format control for identifying format of the translation table entry" incorporated herein by reference teaches an enhanced dynamic address translation facility. In one embodiment, a virtual address to be translated and an initial origin address of a translation table of the hierarchy of translation tables are obtained. An index portion of the virtual address is used to reference an entry in the translation table. If a format control field contained in the translation table entry is enabled, the table entry contains a frame address of a large block of data of at least 1M byte in size. The frame address is then combined with an offset portion of the virtual address to form the translated address of a small 4K byte block of data in main storage or memory.

SUMMARY

Embodiments include a system and computer program product for receiving a request to access a desired block of memory. The request includes an effective address that includes an effective segment identifier (ESID) and a linear address. The linear address includes a most significant portion and a byte index. An entry in a buffer that includes the ESID of the effective address is located. Based on the entry including a radix page table pointer (RPTP), the RPTP is used to locate a translation table of a hierarchy of translation tables. The located translation table is used to translate the most significant portion of the linear address to obtain an address of a block of memory. Based on the obtained address, the requested access is performed to the desired block of memory.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Processors including central processing units (CPUs) may use segment lookaside buffers (SLB) as caches that improve virtual address translation speed. Previous systems have used a single radix page table pointer (RPTP) to access pages using a linear address. Such systems manage a single large region that may have a large gap in memory space. The embodiments described below offer a method, system, and computer readable medium that provides for the use of any number of RPTPs to translate any number of multiple discontiguous virtual memory regions.

Figure 1A:
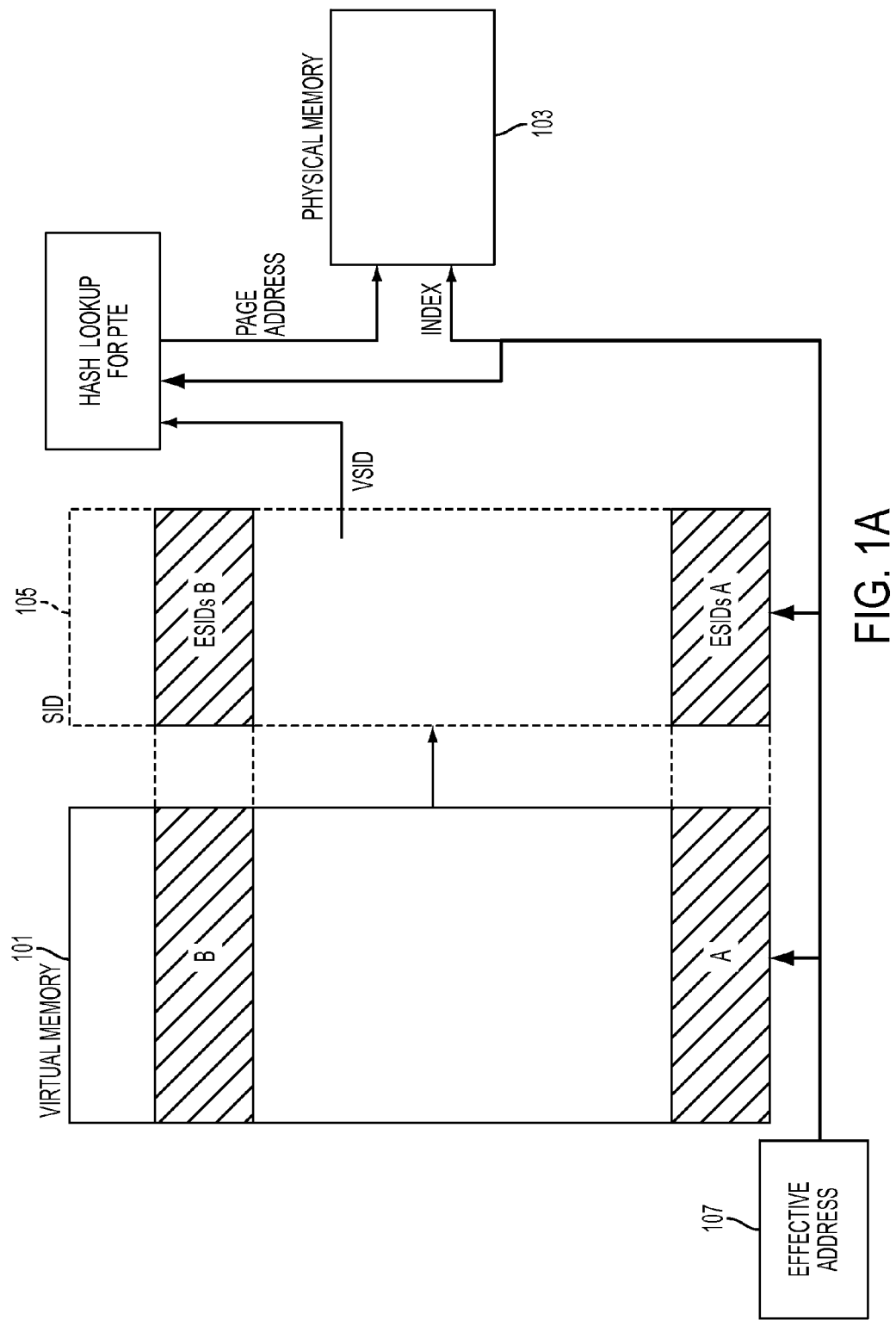
FIG. 1A illustrates an example of a high-level view of a virtual memory (VM) mapped to a physical memory using the Hash PTE (PowerPC) method.

FIG. 1A illustrates an example of a high-level view of a virtual memory (VM) 101 mapped to a physical memory 103 using the Hash page table entry (PTE) method as used by PowerPC for example. In the example, programs only use sections A and B of the VM. All segments of VM are mapped to segment ID (SID) entries identified by effective segment IDs (ESIDs) 105 (ESIDs for B and ESIDs for A included). The "effective address" 107 used by the program selects an SID entry having the ESID value and a virtual segment ID (VSID) value. The VSID value represents the high-order bits of a "virtual address" to be used by a hashing algorithm. A hashed value based on the VSID is used to locate a page table entry (PTE). The page table entry includes an address of a page of physical memory 103.

Figure 1B:
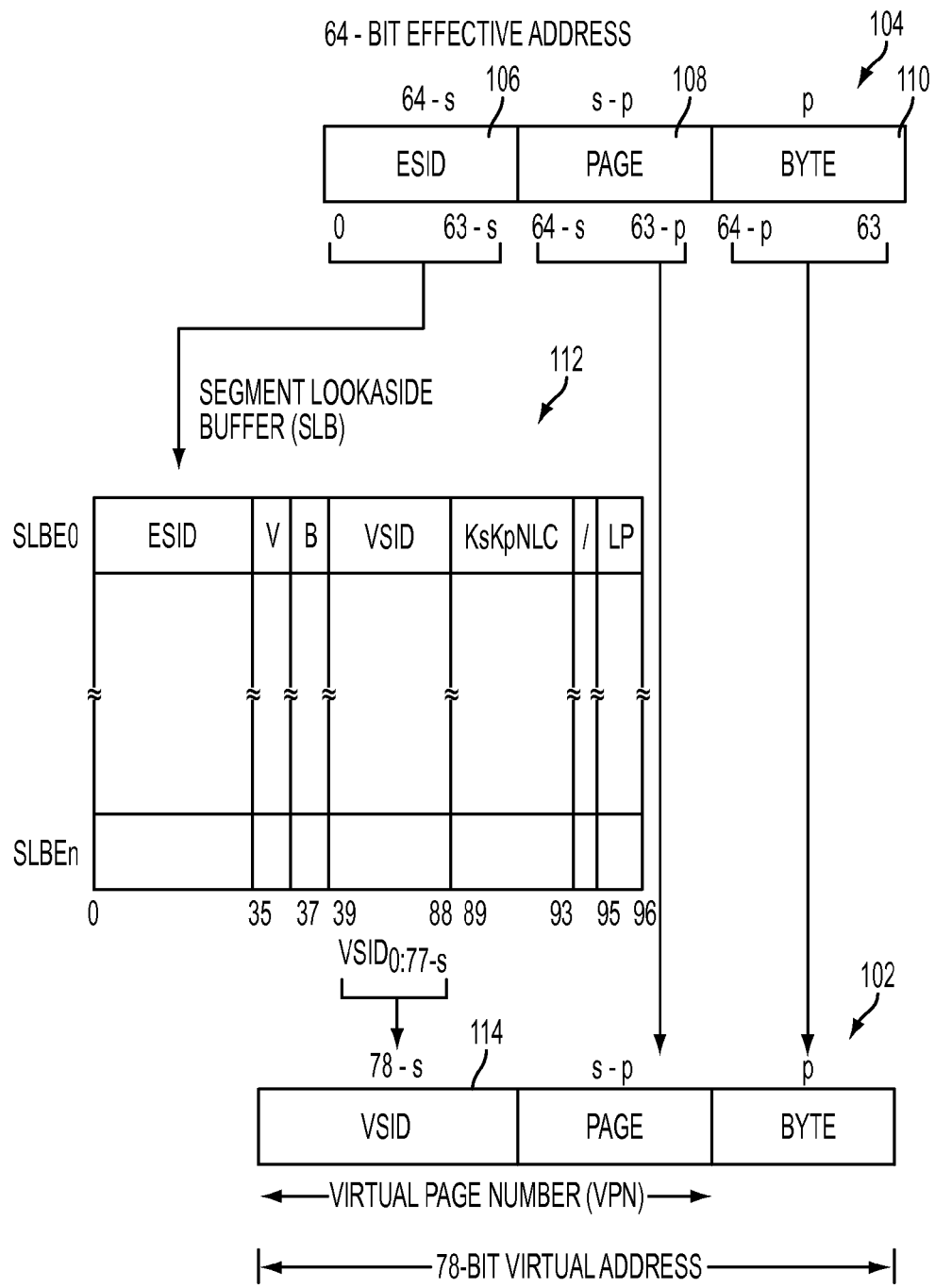
FIG. 1B illustrates an example of a method for generating a virtual address.

FIG. 1B illustrates an example of a method for generating a virtual address 102 for hashing. In this regard, an effective address 104 is received in a memory management unit of a processor that includes effective segment identifier (ESID) field 106, a page field 108 and byte offset (byte field) 110 field. A segment lookaside buffer (SLB) 112 is accessed, and an entry with the ESID 106 of the effective address 104 is located in the SLB 112. The entry with the ESID 106 includes an associated virtual segment identifier (VSID) 114. The associated VSID is used to generate the virtual address 102 that includes the VSID 114 in the SLB 112 associated with the ESID 106 of the effective address 104; and the page 108 and byte 110 from the effective address 104. The virtual address 102 may be used to access physical memory in the memory system. In this disclosure, the terms physical memory, real memory, system memory and absolute memory will be used interchangeably to refer to the main storage, accessible to a processor.

Figure 1C:
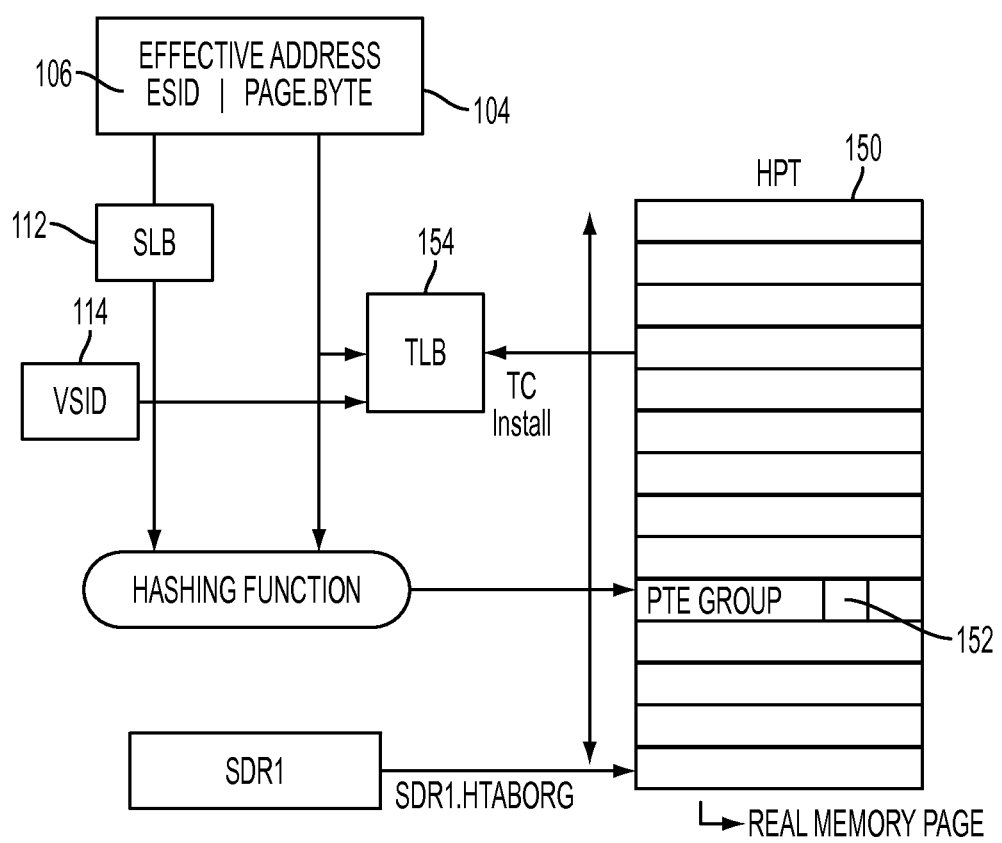
FIG. 1C illustrates an example of a hashed page table (HPT) translation structure used by the Power ISA.

FIG. 1C illustrates an example of a hashed page table (HPT) translation structure used by the PowerPC, Power ISA is further described in detail in the Power ISA™ Version 2.06 Revision B specification incorporated herein by reference. The ESID portion 106 of the effective address (EA) 104 is used to locate an entry in the SLB 112. The entry includes a VSID field 114. The value of the VSID field 114 and a portion of the EA 104 are hashed to produce a hashed value that is used to locate a page table group 152 in the page table (HPT) 150. The PTEs of the group 152 are searched to locate a corresponding PTE having a field matching a value of a most-significant-portion of the VSID. When a corresponding PTE is found, the address of the physical memory page in the PTE is used to access physical memory. In order to improve performance, once a PTE entry is found, the EA 104 portion and address of the physical memory page found in the PTE are stored in the TLB 154, such that further accesses to the same EA page will "hit" in the TLB 154 and avoid the PTE search. The page table is located by a page table origin address provided by the processor.

When a PTE 152 is found in the group that corresponds to the hashed value, the address of the physical memory page in the PTE is used to access physical memory. In order to improve performance, once a PTE entry is found, the EA 104 portion and address of the physical memory page found in the PTE are stored in the TLB 154, such that further accesses to the same EA page will "hit" in the TLB 154 and avoid the PTE search. The page table is located by a page table origin address provided by the processor.

The IBM zArchitecture Principles of Operation SA22-7832-8 and Intel Itanium Archictectrure Software Developer's Manual Volume 2: System Architecture, Document Number: 245318-005 each incorporated by reference herein include descriptions of other address translation schemes using a hierarchy of translation tables.

Figure 2:
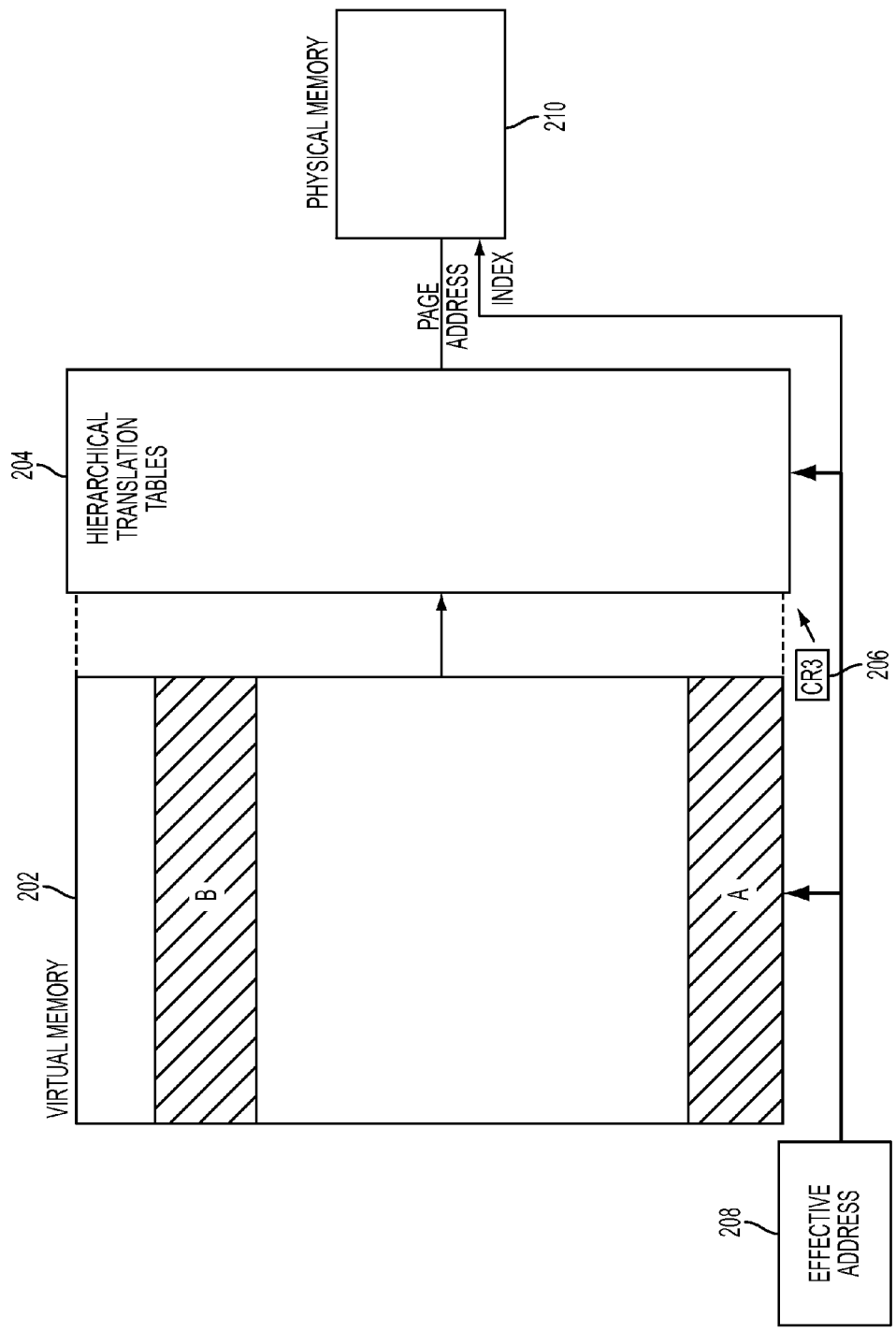
FIG. 2 depicts a Hierarchical translation mechanism.

FIG. 2 depicts an example Hierarchical translation table translation mechanism. In this case, translation tables are provided for translating all of the virtual memory 202, though only regions A and B are to be used. The origin of the highest order translation table of the hierarchical translation tables 204, is provided, for example, by a control register (CR3) 206. The effective address 208 is used to index into each table of the hierarchical translation tables 204 to determine an origin address of the next table to locate, for example, a page table entry (PTE) having an address of a page of physical memory 210.

Figure 3:
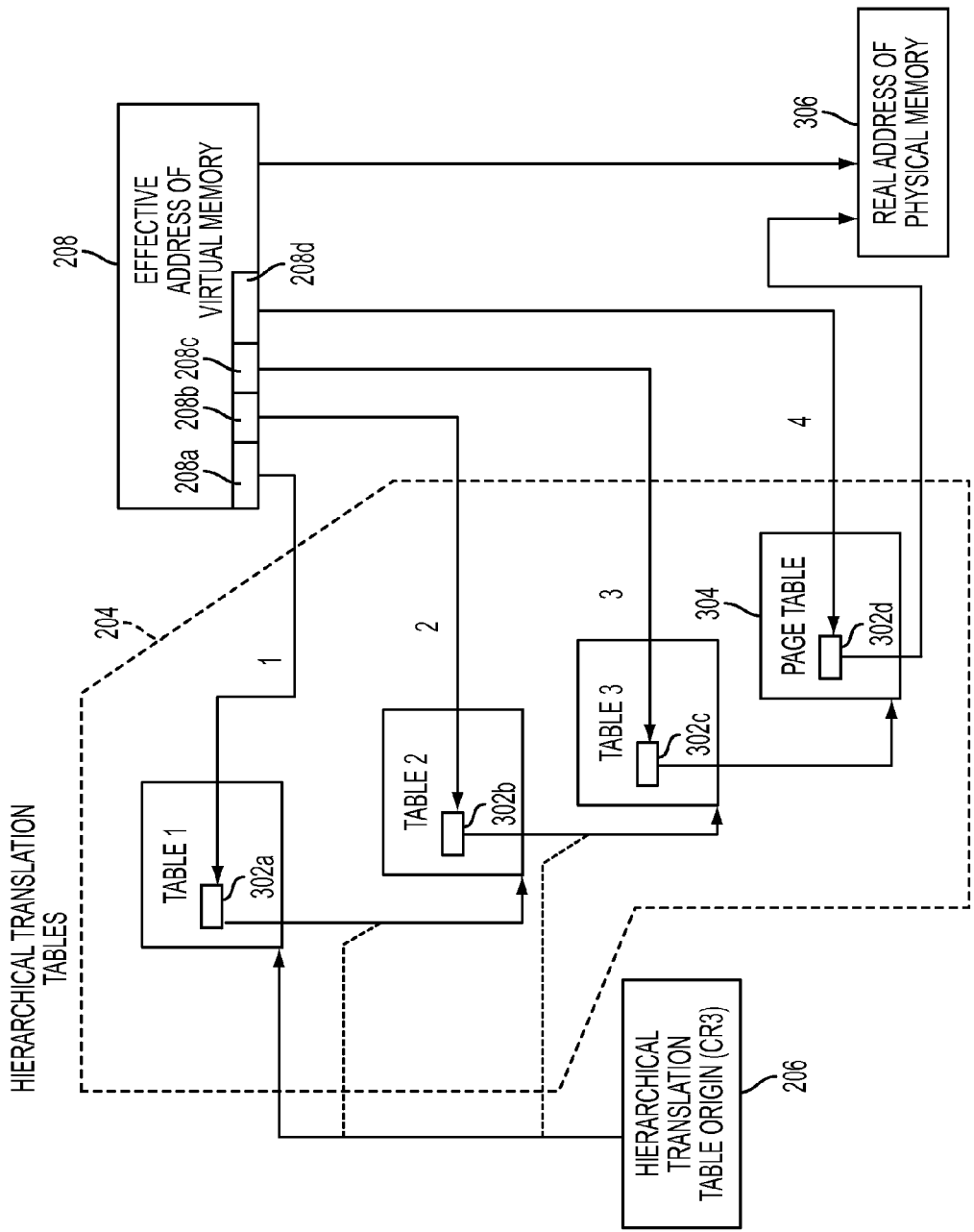
FIG. 3 illustrates an indexing of high level translation tables.

FIG. 3 shows the highest level translation table of the hierarchy is "indexed" by the high portion of the effective address 208a to locate a Table 1 entry 302a that is used to locate the next translation table (Table 2). Similarly a next portion of the effective address 208b is used to index into Table 2 to find a Table 2 entry 302b having the origin address of Table 3. A next portion of the effective address 208c is used to index into Table 3 to find a Table 3 entry 302c having an origin address of a table 304. A next portion of the effective address 208d is used to index into the Table 304 to locate a page table entry 302d having the address of a physical memory page 306. The origin of the hierarchy of translation tables, in an embodiment, may include a table selector field for determining which of said hierarchy of translation tables, the origin applies. Thus, the translation may require only a subset of the hierarchy (wherein an effective address is limited to include a predetermined number of most significant bits having a zero value). A translation using fewer tables will be faster than one using more tables.

Figure 4:
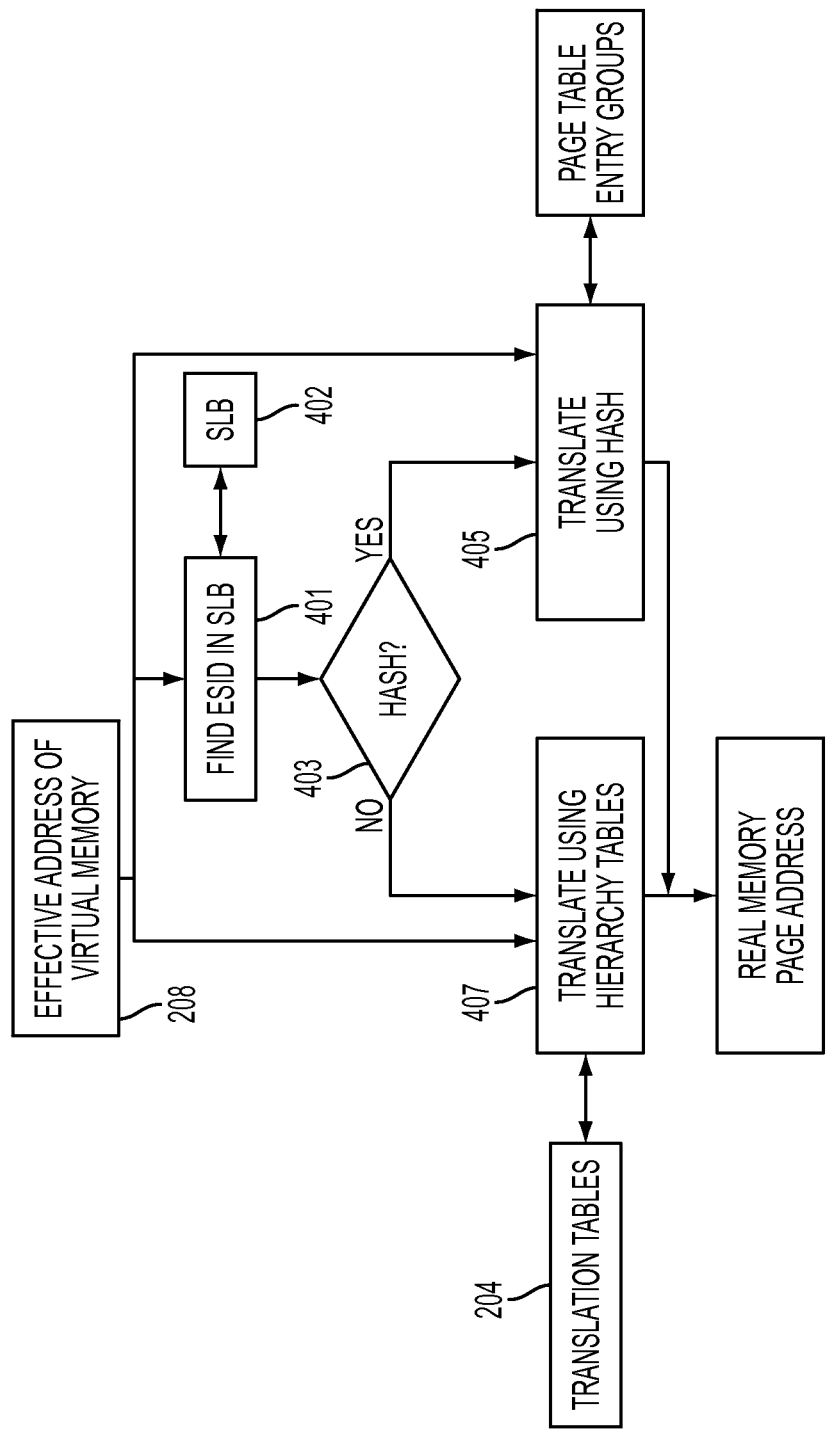
FIG. 4 shows a hybrid translation mechanism.

FIG. 4 shows a hybrid translation mechanism. In the hybrid translation mechanism, the effective address of virtual memory 208 is used to locate an entry corresponding to the ESID in the segment lookaside buffer (SLB) 402 in block 401 as in the previously presented hashing method. However, in the hybrid translation mechanism, either the traditional hashing method is used to locate a PTE, or a hierarchical address translation mechanism is used. The ESID either includes a VSID for hashing (Hash Yes), or a RPTP for locating a hierarchy of translation tables (Hash No) as determined in block 403. If hashing, a page table entry of a group of translation table entries is located using the hash function of FIG. 1A in block 405. If not hashing, the set of translation tables located using the RPTP is used to locate a page of real memory as shown in FIG. 2 in block 407. In an embodiment, only the "Hash No" path is implemented.

Figure 5:
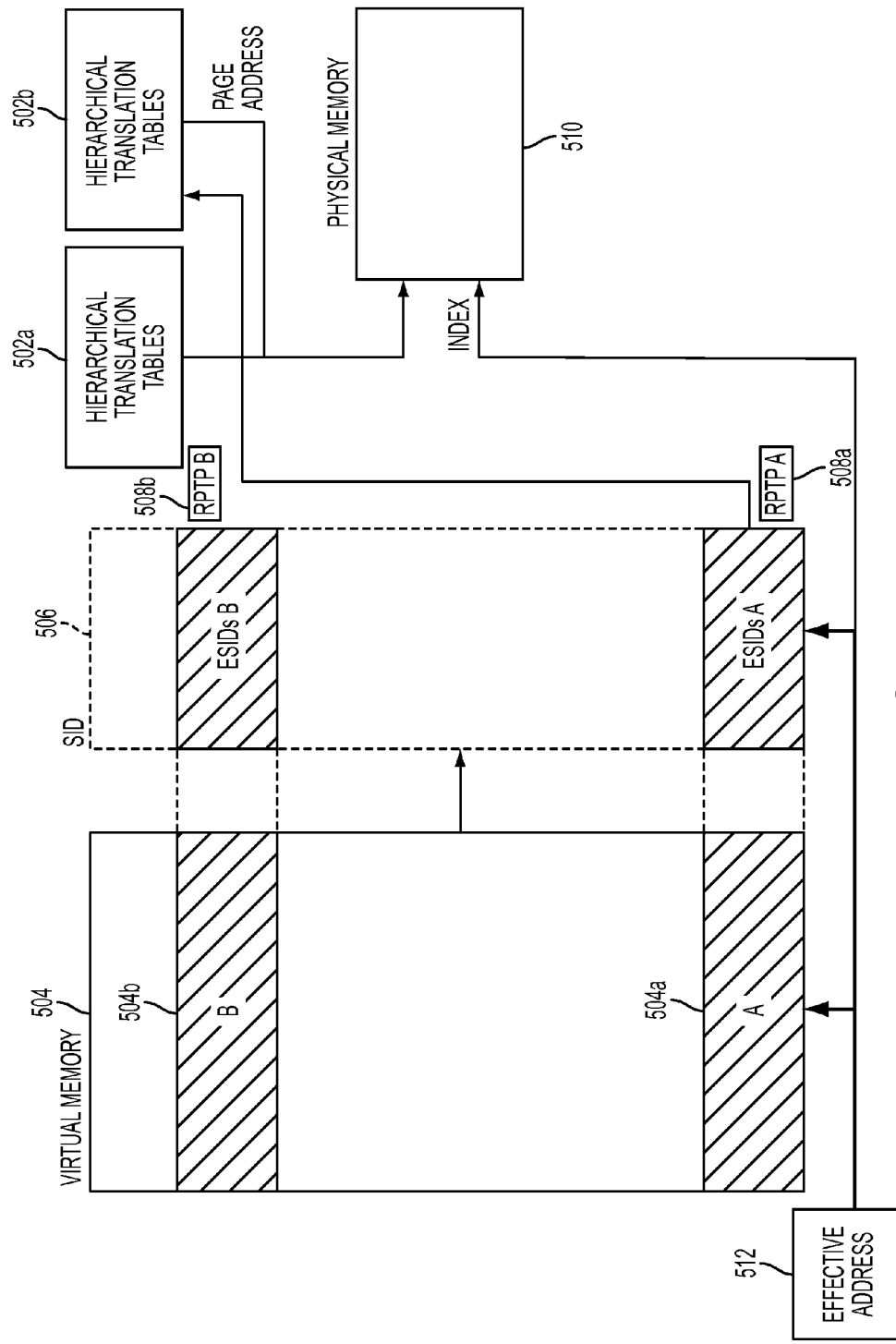
FIG. 5 shows a hybrid translation mechanism.

FIG. 5 shows a high level view of the hybrid hierarchical translation mechanism. In this mechanism, small hierarchical translation table sets 502a and 502b are implemented for respective sub-ranges (A and B 504a and 504b) of virtual memory 504, thus reducing the number of translation tables needed as well as the depth of hierarchy needed for translation. As shown in FIG. 5, an effective address 512 can be used as an index into the virtual memory 504, SID 506 and physical memory 510. The SID 506 functions as in FIG. 1A, to locate an entry having the ESID of the EA and a RPTP 508 rather than a VSID. Each RPTP 508a and 508b includes an origin address of a highest level table of a hierarchical set of translation tables. In an embodiment, the RPTP 508 includes a selector for selecting which level of translation table 502 is to be used as the highest level table. The hierarchical translation tables 502 are searched as in FIG. 2 to locate, for example, a page address of physical memory 510. In an embodiment, real address may be defined by larger segments than a page. For example, zArchitecture provides an option for either a 4 Kbyte page of real memory, or a much larger page, located by a segment table entry rather than the page table entry.

In order to support the smaller tables used for regions A and B of virtual memory, the effective address must be effectively truncated for each region to only include address bits used in a subset of the translation tables. For example, bits for indexing into Table 1, will be zeroed if Table 1 is not to be used.

Figure 6:
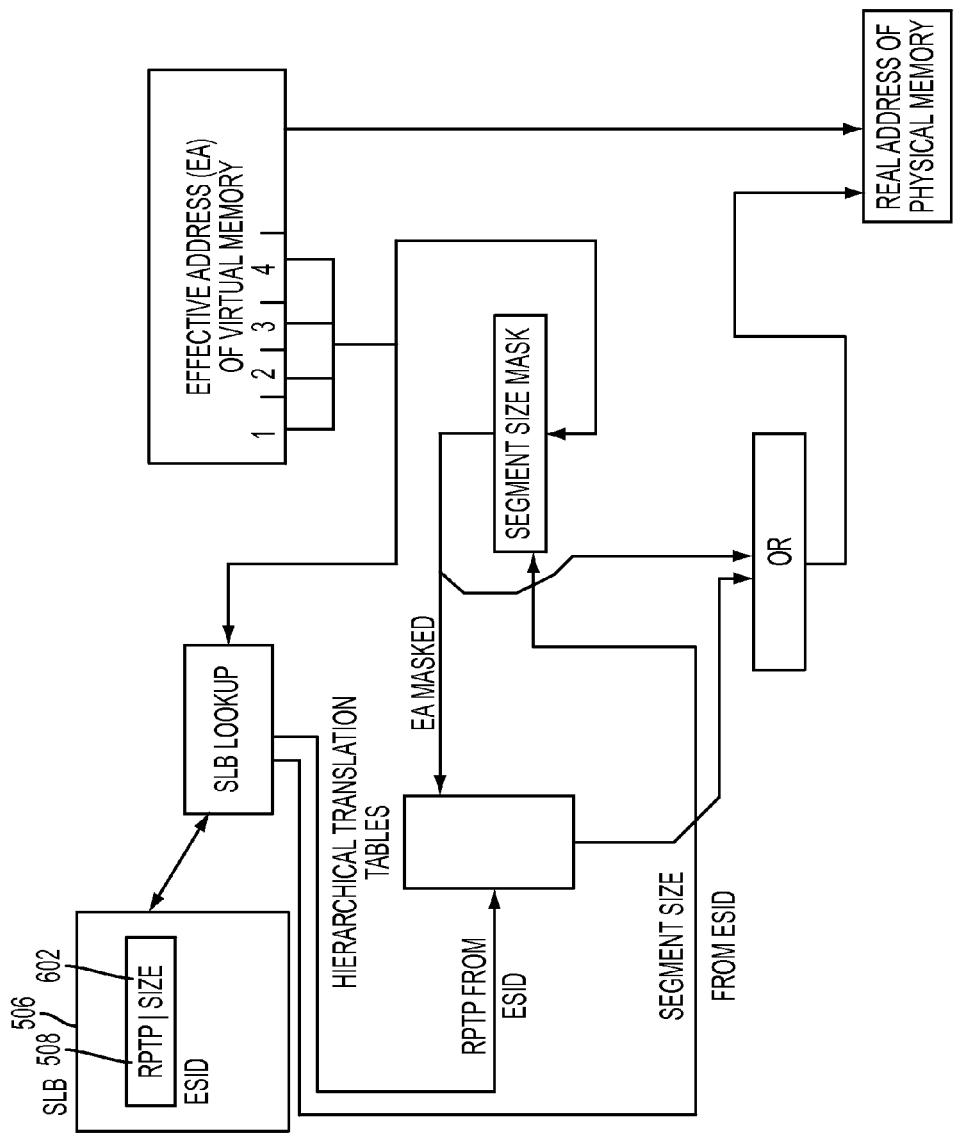
FIG. 6 illustrates a block diagram showing a method for selecting the number of bits of effective address to be used with the RPTP.

FIG. 6 illustrates a block diagram showing an example method for selecting the number of bits of effective address to be used with the RPTP 508 in FIG. 5 by having a size field 602 in the SLB entry and searching sequential SLB entries, for example, for one that is associated with the ESID of the effective address and is configured to access the desired segment size. In another implementation the size of virtual address (segment size) information can be encoded in a single SLB entry, not requiring the above search.

When an SLB entry is found, the RPTP portion is used to find the origin address of the first translation table, of the hierarchy of translation tables to be used. The size field 602 is used to generate a segment size mask. The segment size mask truncates high order bits of the effective address (EA) that will not be needed for indexing into translation tables. The segment size mask is used to direct the portion of the EA that will be used to index into a block of real address of memory, wherein the address of the block is provided by the translation tables. Thus, only a minimal number of translation tables are needed for each RPTP.

Figure 7:
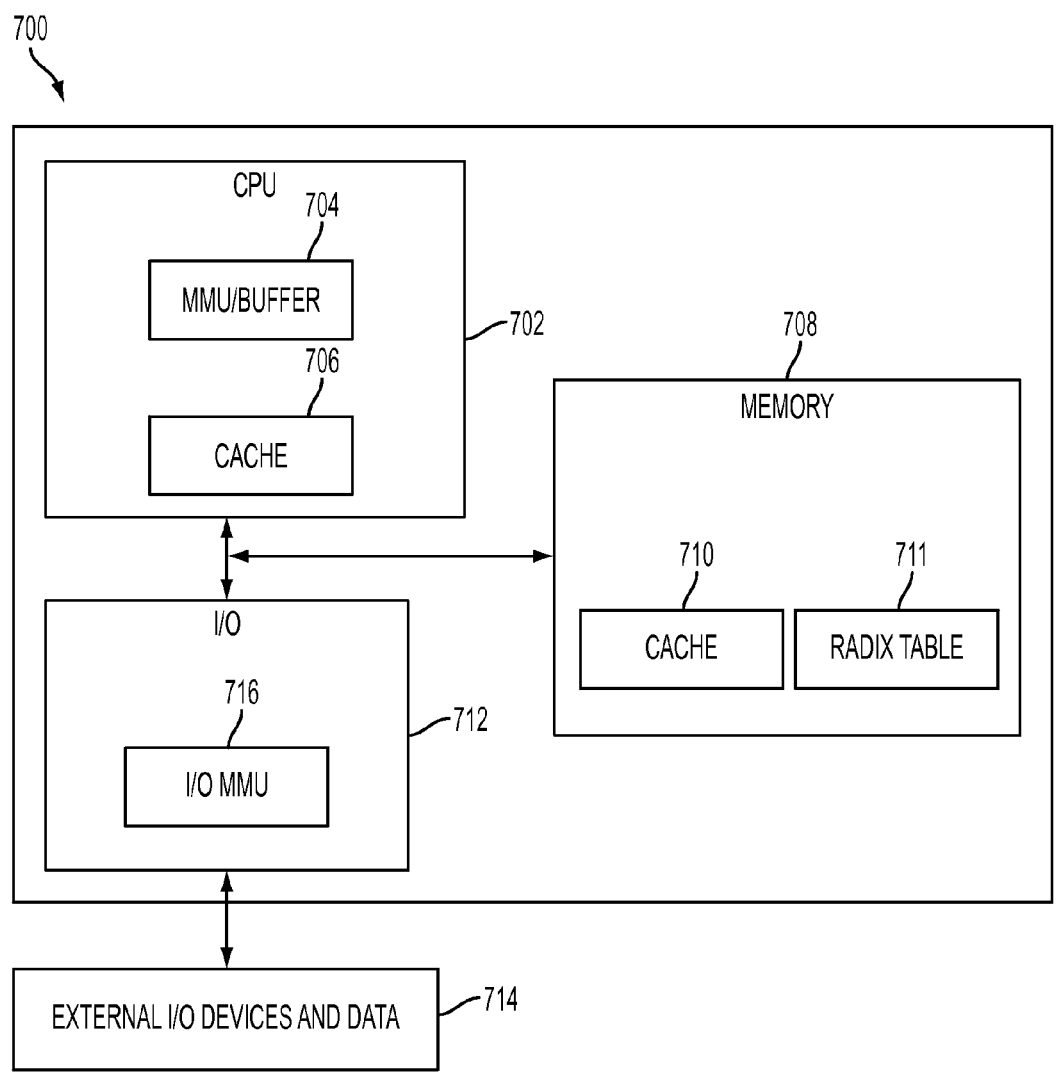
FIG. 7 illustrates an exemplary embodiment of a processor system.

Turning now to FIG. 7, an exemplary embodiment of a processor system (system) 700, in generally shown. The system 700 includes a processor (CPU) 702 that includes a memory management unit/TLB portion 704 and a local cache 706. The processor 702 is communicatively connected to a memory subsystem 708 having one or more caches 710, and main storage. Translation (Radix) tables, SIDs are typically stored in main storage. The processor is connected to an input/output (I/O) controller 712. The I/O controller 712 includes an I/O memory management unit (I/O MMU) 716 and is communicatively connected to external I/O devices 714 that may include, for example, data input devices, sensors, and output devices such as displays. In other embodiments (not shown), the processor 702 may have a interface to memory 708 that is separate the I/O controller interface.

Figure 8:
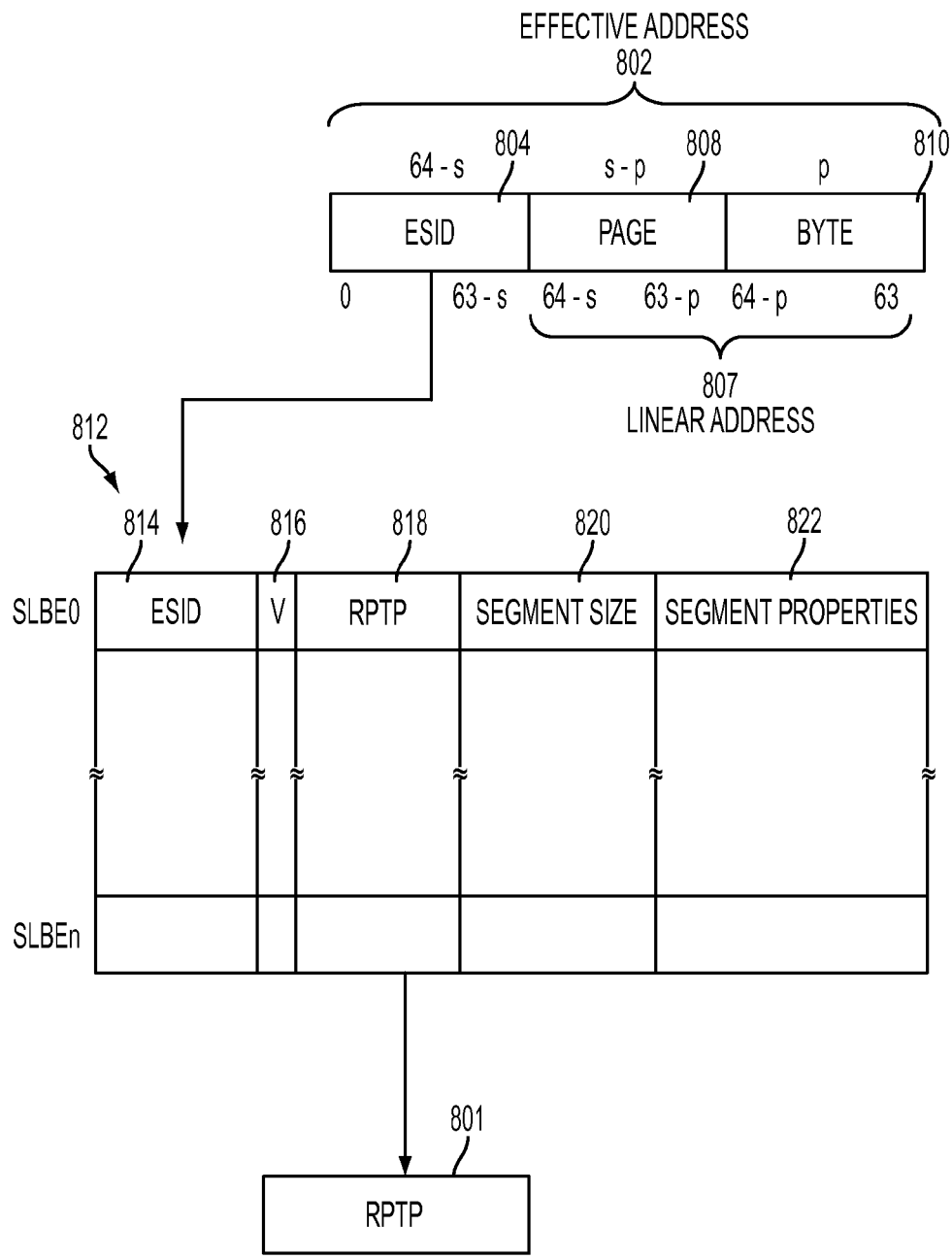
FIG. 8 illustrates an exemplary of a method for accessing a memory location.

FIG. 8 illustrates an exemplary of a method for translating an effective address to a obtain the SLB entry having the desired radix page table pointer RPTP. In this regard, an effective address 802 is received in the memory management unit 704 of the system 700 (of FIG. 7). The effective address 802 includes an effective segment identifier (ESID) portion 804 and a linear address portion 807, the linear address portion 807 includes, for example, page 808 portion and byte offset (byte) 810 portion. An exemplary SLB buffer 812 is accessed. The buffer 812 includes, for example, a content addressable table that includes entries having an ESID 814 field, a valid entry field (V) 816, a radix page table pointer (RPTP) field 818, a segment size field 820, and a segment properties field 822. The segment properties 822 can specify parameters to those skilled in the art such as access permissions, access types (cacheable, cache inhibited, I/O), tree geometry (number of levels, number of bits per level, etc.), and most/least-recently-used indication. Segment properties 822 can specify parameters such as overrides to fields contained in the segment page table entries, as well as properties defining parameters such as the handling of joined page table entries. In an exemplary operation, an entry with the ESID 804 of the effective address 802 is identified in the SLB 812. The RPTP 801 of the identified entry is retrieved from the SLB 812.

The RPTP 801 and the linear address 807 are used, for example, to access a memory location using, for example, a hierarchy of address translation tables (a radix table (i.e., radix tree)), such as the radix table 711 of FIG. 7 as described below. Each entry (SLBE0 . . . SLBEn) of the SLB 812 is searched, in parallel or sequentially, or a combination of the two, until an SLB entry is found that matches the ESID. If the valid bit 816 is set for the SLB Entry, segment size 820 is used to construct a mask to extract ESID 804 and linear address 807. The value of "s" in effective address 802 is unknown until a match from SLB 812 occurs. In an exemplary embodiment segment size 820 is a power-of-two integer "n" such that $2^n$ represents the segment size in bytes. Thus, for n=30, the segment size is computed to be one gigabyte. The mask "mc" used to extract the linear address is the segment size minus one byte, thus ($2^n-1$). The mask "m" used to extract the ESID 304 is the ones complement of the mask "mc" used to extract the linear address, thus ($\sim(2^n-1)$). Effective Address 802 is bitwise logical ANDed with "m". The ESID in the SLB Entry is bitwise logical ANDed with "m". If the results of the logical functions above are equal, the matching SLB Entry has been found. The RPTP 801 is selected from the matching SLB Entry. The Linear Address 807 may also be determined as "s" is definitively known. It is effective address 802 bitwise logical ANDed with "mc". If the results of the logical functions above are not equal, the search continues. If the search fails when all SLBEs are exhausted, the system interrupt handler or some other mechanism is invoked to signal an error condition.

In some exemplary embodiments fields such as process ID, thread ID, processor ID, and partition ID, are compared with those corresponding values stored in the SLBEs. These IDs are independent of effective address 802 and establish a context for effective address 802. In that way, instead of being tasked to flush the SLB when a processor switches to a different process (e.g., both processes could be using the same address 2000 in different ways), both processes may co-exist in the same SLB. For thread/processor/partition IDs, they broaden the context beyond a running program such that they specify actual or virtualized hardware.

In another embodiment of the method described above in FIG. 8, SLBEs contain a field or fields allowing selectable translation such that one entry selects an RPTP, and another entry selects another translation scheme based upon direct translation of contiguous memory blocks, hashed page table translated regions, and so forth.

Figure 9:
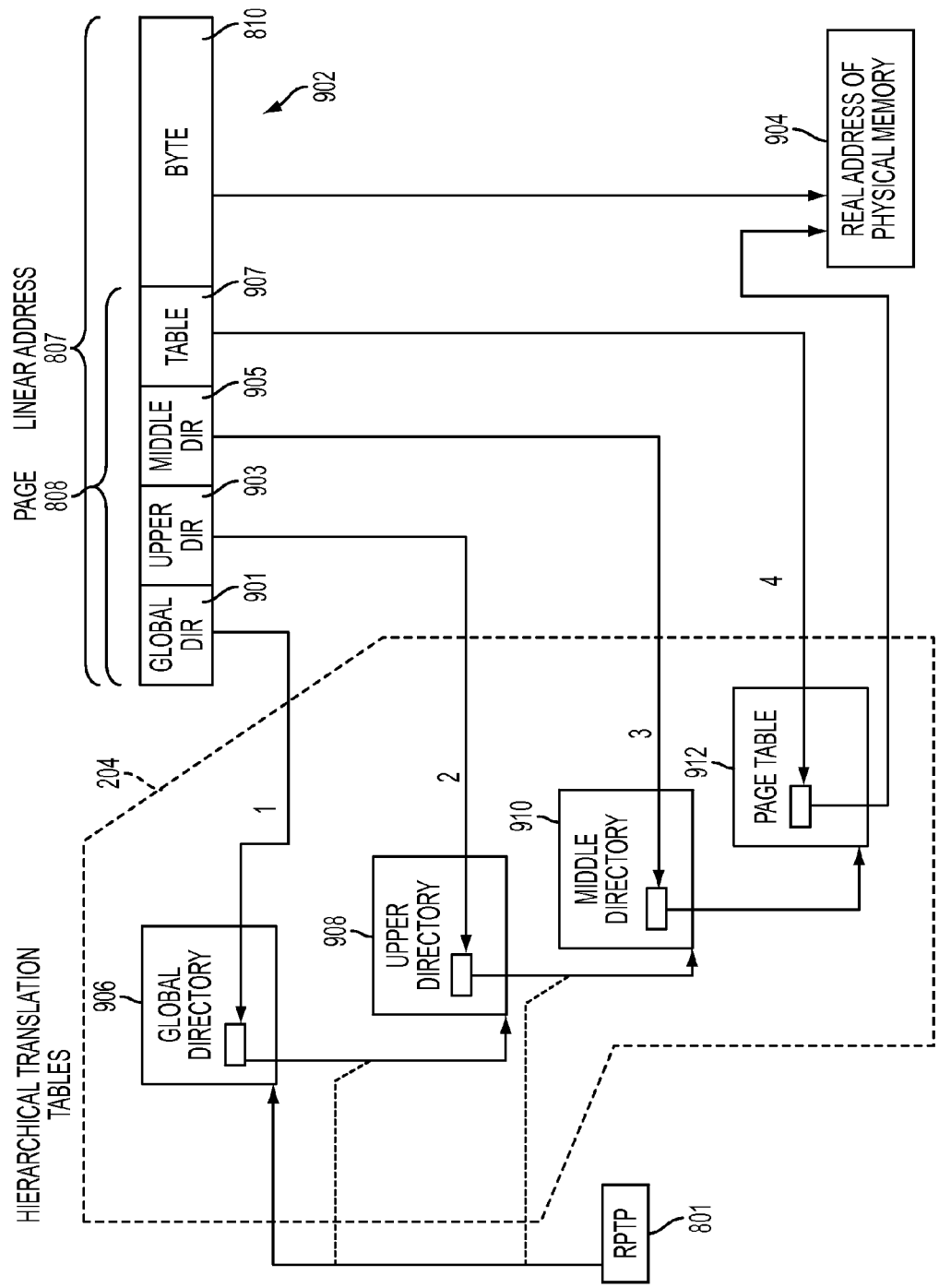
FIG. 9 illustrates an exemplary embodiment of a linear address and tables (tables/directories) that correspond to the linear address.

FIG. 9 illustrates an exemplary embodiment of a linear address 807 and tables (tables/directories) 902 that correspond to the linear address 807. The tables 902 are used to translate a page address to access a page 904 using the RPTP 801 and the linear address 807. The page 808 identifier of the linear address 807 may be divided or allocated to identify any number of directories having any designation or nomenclature. For illustrative purposes, the exemplary embodiment includes a page 808 identifier that is divided into identifier portions (a global directory portion 901, an upper directory portion 903, a middle directory portion 905, and a page table portion 907) corresponding to four directories (a global directory 906, an upper directory 908, a middle directory 910, and a page table 912).

In this regard, an appropriate number of zeros are appended to the RPTP 801 to construct a global directory pointer. The number of zeros appended corresponds to the size of the global directory 906. For this example, the global directory 906 is 512 entries with 8 bytes per entry resulting in a total size of 4096 bytes. Thus, twelve zeros ($\log_2 4096$)

in this example are appended to the RPTP 801 value. (All tables/directories have 8 bytes per entry corresponding to a 64-bit example.) The 36-bit page 808 is subdivided into four sets of 9 bits each to navigate through the global directory 906, upper directory 908, middle directory 910, and page table 912. For this example, the RPTP 801 will be 0x0000000000100000 and the linear address 807 will be 0x1234567890AB. Starting at the global directory 906, the 9 most significant bits of the linear address 807 (the value 36) are extracted and used as a 0 . . . 511 index into the global directory 906 and the entry at memory location 0x0000000000100000+36*8 is read. The value read is treated as a pointer to the upper directory 908. (For this example, 0x0000000000200000 is returned.) The next nine most significant bits of linear address 807 (the value 209) are extracted and used as a 0 . . . 511 index into the upper directory 908 and the entry at memory location 0x0000000000200000+209*8 is read. The value read is treated as a pointer to the middle directory 410. (For this example, 0x0000000000300000 is returned.) The next nine most significant bits of linear address 807 (the value 179) are extracted and used as a 0 . . . 511 index into the middle directory 910 and the entry at memory location 0x0000000000300000+179*8 is read. The value read is treated as a pointer to the page table 912. (For this example, 0x0000000000400000 is returned.) The remaining, least significant nine bits (the value 393) of linear address 807 are extracted and used as a 0 . . . 511 index into the page table 912 and the entry at memory location 0x0000000000400000+393*8 is read. The value read is treated as a pointer to the page 904. (For this example, 0x0000000000500000 is returned.) The 12 bits of byte 810 of the linear address 807 (the value 171) are added to the value of page 904 (0x0000000000500000) resulting in the fully translated address: 0x00000000005000AB.

FIG. 9 includes but one example of a linear address and corresponding tables/directories. Other examples may include a differing number of tables, or a permutation, inversion, or skipping of bits of the linear address, which results in an alternative table access pattern.

Though the illustrated embodiments describe a system using 64-bit effective addresses 804, any other effective addresses of any alternative size may be used.

Figure 10:
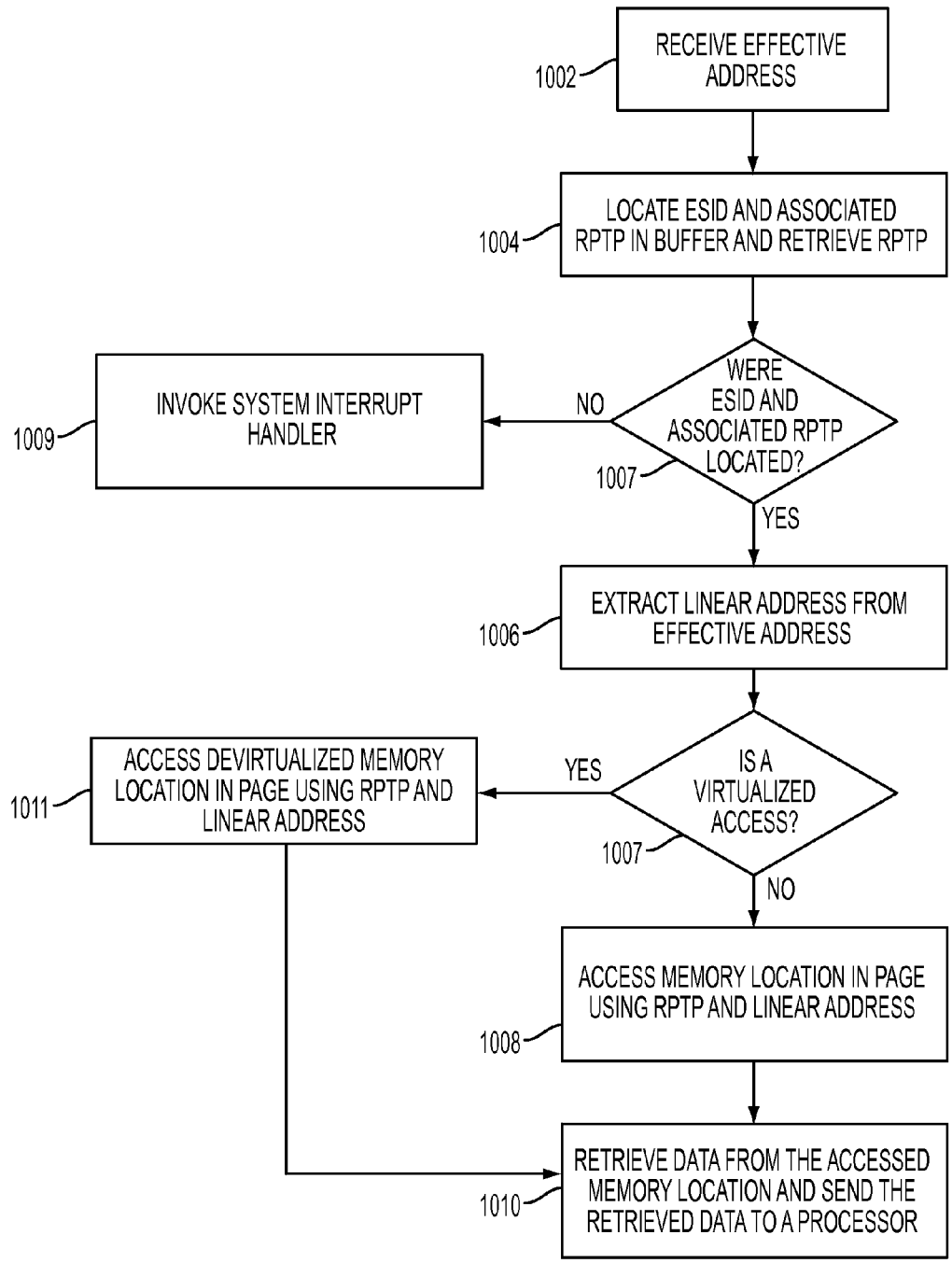
FIG. 10 illustrates a block diagram of an exemplary method for accessing a memory page.

FIG. 10 illustrates a block diagram of an exemplary method for accessing a memory page with a processor system such as, for example, the system 700 (of FIG. 7). In this regard, in block 1002, an effective address 802 (of FIG. 8) is received in a memory management unit 704. The memory management unit 704 identifies an entry in the buffer 812 that includes the ESID 804 of the effective address and retrieves the RPTP 801 that is associated with the ESID 804 from the identified buffer entry and retrieves the RPTP 801 in block 1004. If the search fails when all SLBEs are exhausted in block 1007, the system interrupt handler or another mechanism is invoked to signal an error condition in block 1009. In block 1006, the memory management unit 704, extracts the linear address 807 from the effective address 802. In block 1007, the system 700 determines whether the access is a virtualized access. If yes, in block 1011, the devirtualized memory location is accessed in the page using the devirtualized equivalent of RPTP 801 and the devirtualized equivalent of linear address 807. In block 1008, the RPTP 801 and the linear address 807 are used with the tables 902 (of FIG. 9) to create a translated address and access a memory location in a page 904 (as discussed above). In block 1010, the data in the accessed memory locations are sent to the processor 702.

Figure 11:
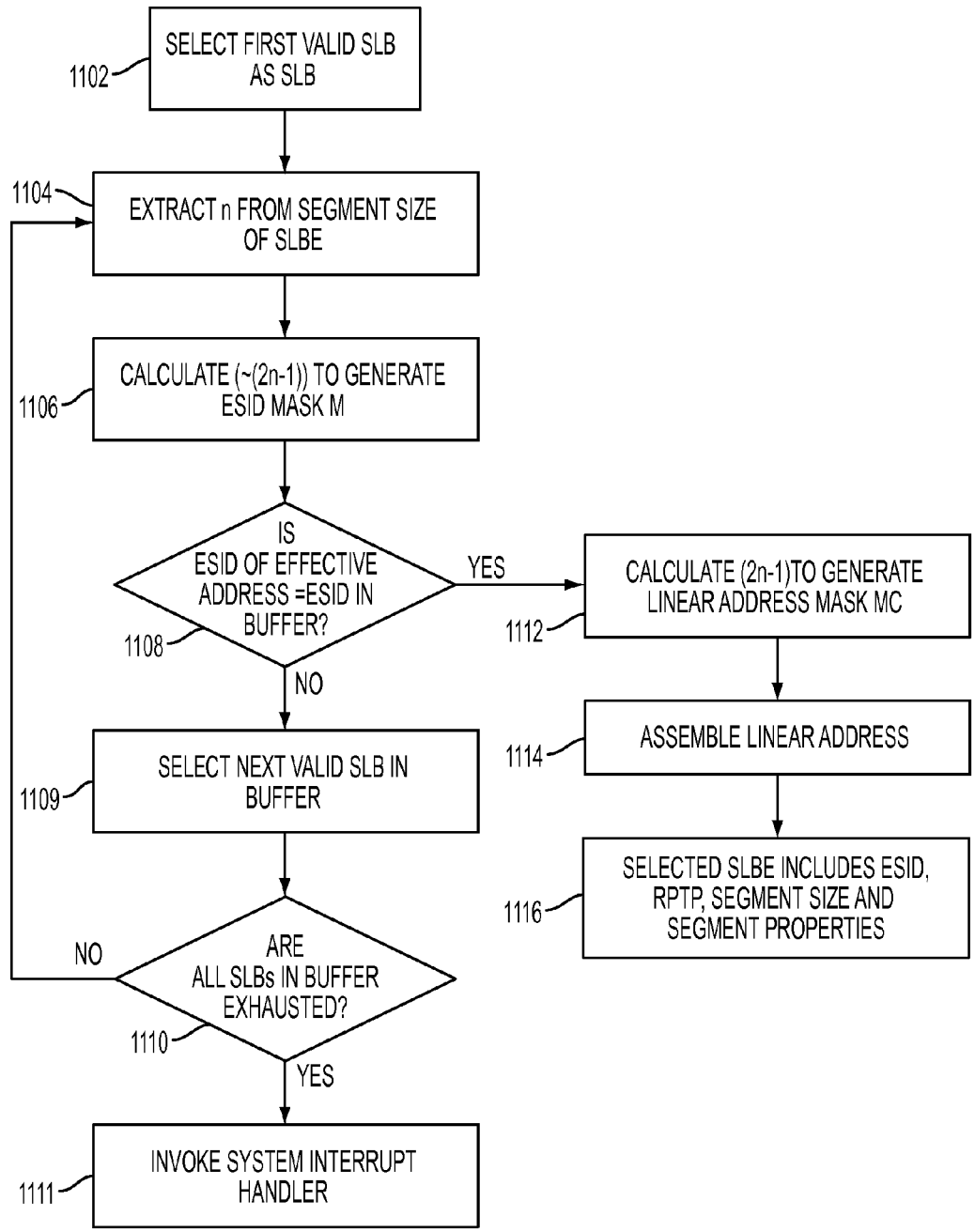
FIG. 11 illustrates a block diagram of an exemplary method for locating the ESID and associated RPTP and extracting the linear address from the effective address.

FIG. 11 illustrates a block diagram of an exemplary method for locating the ESID and associated RPTP and extracting the linear address from the effective address as described in blocks 1004 and 1006 of FIG. 10 above. In this regard, referring to FIG. 11, in block 1102, the first valid SLBE is selected. The n value is extracted from the segment size of the SLBE in block 1104. In block 1106, the ESID mask M is generated by calculating $(\sim(2^n-1))$. If the ESID of the effective address bitwise ANDed with M are not equal to the ESID of the buffer bitwise ANDed with M in block 1108, the next valid SLBE is selected in block 1109. If all SLBEs have been exhausted in block 1110, a system interrupt handler is invoked in block 1111. In block 1112, $(2^n-1)$ is calculated to generate linear address mask Mc. The linear address is assembled by bitwise ANDing the mask Mc with the effective address in block 1114. In block 1116, the selected SLBE includes the ESID, the RPTP, the segment size, and segment properties.

Figure 12:
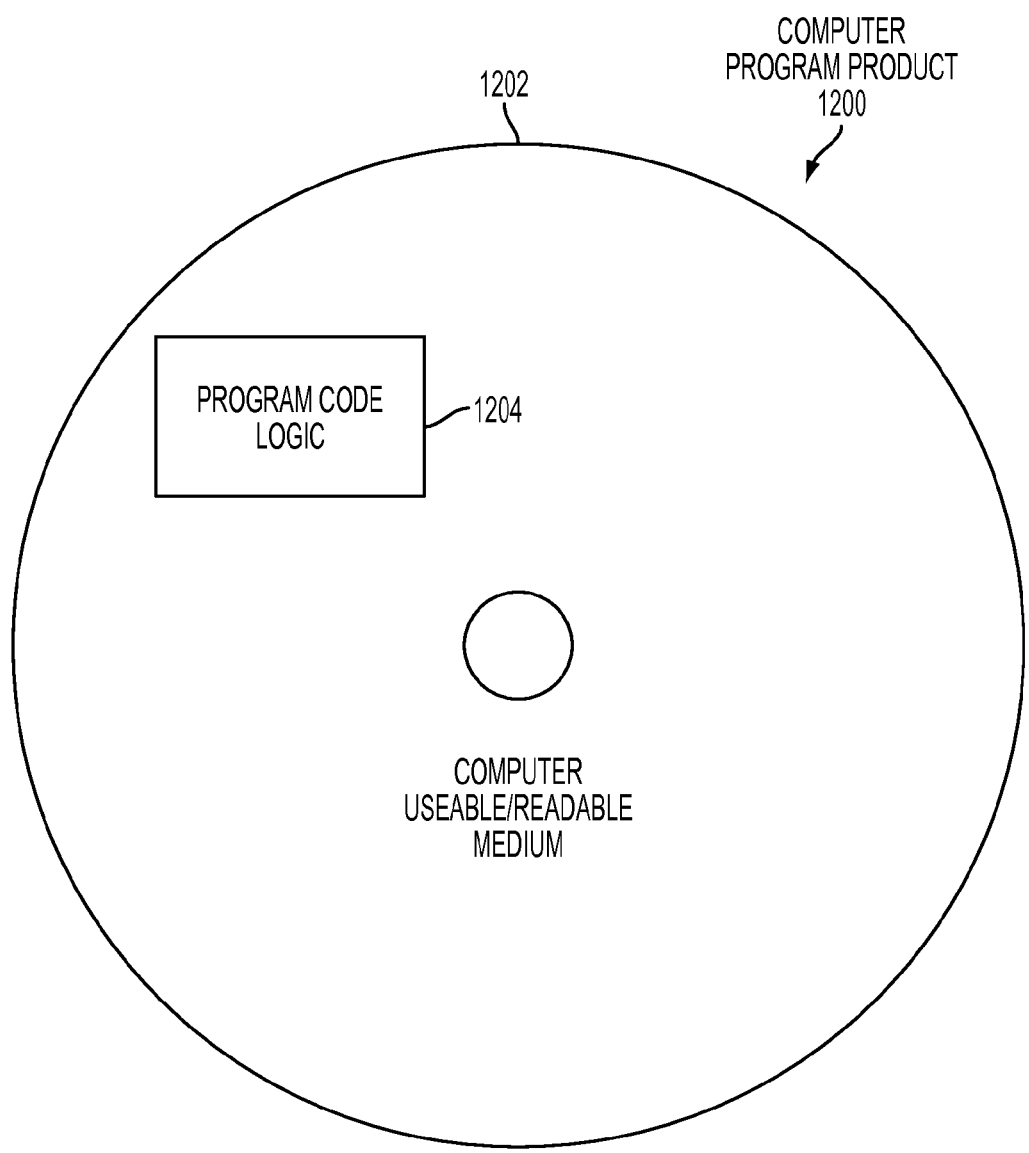
FIG. 12 illustrates an exemplary embodiment of a computer program product.

As described above, embodiments can be embodied in the form of computer-implemented processes and apparatuses for practicing those processes. An embodiment may include a computer program product 1200 as depicted in FIG. 12 on a computer readable/usable medium 1202 with computer program code logic 1204 containing instructions embodied in tangible media as an article of manufacture. Exemplary articles of manufacture for computer readable/usable medium 1202 may include floppy diskettes, CD-ROMs, hard drives, universal serial bus (USB) flash drives, or any other computer-readable storage medium, wherein, when the computer program code logic 1204 is loaded into and executed by a computer, the computer becomes an apparatus for practicing the invention. Embodiments include computer program code logic 1204, for example, whether stored in a storage medium, loaded into and/or executed by a computer, or transmitted over some transmission medium, such as over electrical wiring or cabling, through fiber optics, or via electromagnetic radiation, wherein, when the computer program code logic 1204 is loaded into and executed by a computer, the computer becomes an apparatus for practicing the invention. When implemented on a general-purpose microprocessor, the computer program code logic 1204 segments configure the microprocessor to create specific logic circuits.

The technical effects and benefits of the methods and systems described above allow any number of RPTPs to translate any number of multiple discontiguous memory regions to access data in memory locations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer program product for accessing a memory location in a processing system, the computer program product comprising:
a non-transitory computer readable storage medium readable by a processing circuit and storing instructions for execution by the processing circuit for performing a method comprising:
receiving a request to access a desired block of memory located in one of a plurality of non-contiguous virtual memory regions, the request comprising an effective address consisting of an effective segment identifier (ESID) and a linear address, the linear address consisting of a most significant portion and a byte index;
locating, by a processor, an entry corresponding to the effective address in a segment lookaside buffer (SLB) that includes multiple entries that include radix page table pointers (RPTPs) corresponding to the plurality of non-contiguous virtual memory regions; and
based on the located entry corresponding to the effective address in the SLB including an RPTP corresponding to the one of the plurality of non-contiguous virtual memory regions, performing:
using the RPTP from the located entry to locate a translation table of a hierarchy of translation tables;
using the located translation table to translate the entirety of the most significant portion of the linear address to obtain an address of a block of memory; and
based on the obtained address, performing the requested access to the desired block of memory.

2. The computer program product of claim 1, further comprising using the byte index of the linear address and the obtained address to form an address of the desired block of memory.

3. The computer program product of claim 1, wherein a table level of the located translation table of the hierarchy of translation tables is indicated by the RPTP.

4. The computer program product of claim 1, wherein the RPTP specifies a size of the linear address.

5. The computer program product of claim 1, wherein a portion of the linear address is used to index into the located translation table to locate a translation table entry, the translation table entry comprising an origin address of a next level translation table of the hierarchy of translation tables.

6. The computer program product of claim 1, wherein the linear address includes a page identifier and a byte offset identifier.

7. The computer program product of claim 1, wherein locating the entry corresponding to the effective address in the SLB comprises:
selecting a first valid entry in the SLB;
extracting a segment size from the first valid entry;
calculating an ESID mask of the first valid entry based on the extracted segment size;
determining whether an ESID of the first valid entry corresponds to the ESID of the effective address based on the ESID mask;
based on determining that the ESID mask of the first valid entry corresponds to the ESID of the effective address, determining that the first valid entry is the located entry corresponding to the effective address in the SLB; and
based on determining that the ESID mask of the first valid entry does not correspond to the ESID of the effective address, determining that the first valid entry is not the entry corresponding to the effective address in the SLB, and selecting a next valid entry in the SLB.

8. The computer program product of claim 1, wherein, in the effective address, the ESID is located adjacent to and before the most significant portion of the linear address, and the most significant portion of the linear address is located adjacent to and before the byte index of the linear address.

9. A computer system for accessing a memory location, the system comprising:
a memory; and
a processor configured to perform a method comprising:
receiving a request to access a desired block of memory located in one of a plurality of non-contiguous virtual memory regions, the request comprising an effective address consisting of an effective segment identifier (ESID) and a linear address, the linear address consisting of a most significant portion and a byte index;
locating, by a processor, an entry corresponding to the effective address in a segment lookaside buffer (SLB) that includes multiple entries that include radix page table pointers (RPTPs) corresponding to the plurality of non-contiguous virtual memory regions; and
based on the located entry corresponding to the effective address in the SLB including an RPTP corresponding to the one of the plurality of non-contiguous virtual memory regions, performing:
using the RPTP from the located entry to locate a translation table of a hierarchy of translation tables;
using the located translation table to translate the entirety of the most significant portion of the linear address to obtain an address of a block of memory; and
based on the obtained address, performing the requested access to the desired block of memory.

10. The system of claim 9, further comprising using the byte index of the linear address and the obtained address to form an address of the desired block of memory.

11. The system of claim 9, wherein a table level of the located translation table of the hierarchy of translation tables is indicated by the RPTP.

12. The system of claim 9, wherein the RPTP specifies a size of the linear address.

13. The system of claim 9, wherein a portion of the linear address is used to index into the located translation table to locate a translation table entry, the translation table entry comprising an origin address of a next level translation table of the hierarchy of translation tables.

14. The system of claim 9, wherein locating the entry corresponding to the effective address in the SLB comprises:
selecting a first valid entry in the SLB;
extracting a segment size from the first valid entry;
calculating an ESID mask of the first valid entry based on the extracted segment size;
determining whether an ESID of the first valid entry corresponds to the ESID of the effective address based on the ESID mask;
based on determining that the ESID mask of the first valid entry corresponds to the ESID of the effective address, determining that the first valid entry is the located entry corresponding to the effective address in the SLB; and
based on determining that the ESID mask of the first valid entry does not correspond to the ESID of the effective address, determining that the first valid entry is not the entry corresponding to the effective address in the SLB, and selecting a next valid entry in the SLB.

15. The system of claim 9, wherein, in the effective address, the ESID is located adjacent to and before the most significant portion of the linear address, and the most significant portion of the linear address is located adjacent to and before the byte index of the linear address.

\* \* \* \* \*